(12) United States Patent
Yoshikawa et al.

(10) Patent No.: US 9,813,588 B2
(45) Date of Patent: Nov. 7, 2017

(54) IMAGE PROCESSING APPARATUS AUTHENTICATION SYSTEM AND IMAGE PROCESSING APPARATUS

(71) Applicants: Takashi Yoshikawa, Kanagawa (JP); Takuya Inoue, Kanagawa (JP); Takahiko Uno, Tokyo (JP)

(72) Inventors: Takashi Yoshikawa, Kanagawa (JP); Takuya Inoue, Kanagawa (JP); Takahiko Uno, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/916,121

(22) PCT Filed: Sep. 2, 2014

(86) PCT No.: PCT/JP2014/073597
§ 371 (c)(1),
(2) Date: Mar. 2, 2016

(87) PCT Pub. No.: WO2015/034076
PCT Pub. Date: Mar. 12, 2015

(65) Prior Publication Data
US 2016/0227072 A1 Aug. 4, 2016

(30) Foreign Application Priority Data
Sep. 3, 2013 (JP) .................................. 2013-182297

(51) Int. Cl.
*H04N 1/04* (2006.01)
*H04N 1/44* (2006.01)
(Continued)

(52) U.S. Cl.
CPC ............ *H04N 1/4413* (2013.01); *B41J 29/00* (2013.01); *B41J 29/38* (2013.01); *G06F 21/31* (2013.01);
(Continued)

(58) Field of Classification Search
CPC .... H04N 1/4413; H04N 1/00; H04N 1/00204; H04N 1/00347; H04N 2201/0031; H04N 2201/0094
(Continued)

(56) References Cited

U.S. PATENT DOCUMENTS

2006/0064741 A1  3/2006  Terao
2007/0157308 A1  7/2007  Bardsley et al.
(Continued)

FOREIGN PATENT DOCUMENTS

EP  2 037 353 A2  3/2009
JP  2001-318564  11/2001
(Continued)

OTHER PUBLICATIONS

International Search Report issued on Dec. 9, 2014 in PCT/JP2014/073597 filed on Sep. 2, 2014.
(Continued)

*Primary Examiner* — Houshang Safaipour
(74) *Attorney, Agent, or Firm* — Oblon, McClelland, Maier & Neustadt, L.L.P.

(57) ABSTRACT

An image processing apparatus serving as a master device and a plurality of local image processing apparatus serving as local devices are connected to one another via a network, and each of the devices includes an authentication information storage unit and an authentication unit. The master device stores, as master authentication information, authentication information necessary for an authentication on each of users who are able to use each of the devices, for each of (Continued)

the devices, and allows editing of the master authentication information. When the authentication information on the local device in the master authentication information is edited, the edited authentication information is transmitted to the local device, and the authentication information stored in local device is updated. When a user login operation is performed on the local device, an authentication is performed by using the authentication information in the local device.

9 Claims, 6 Drawing Sheets

(51) Int. Cl.
  *B41J 29/00* (2006.01)
  *B41J 29/38* (2006.01)
  *G06F 21/31* (2013.01)
  *H04N 1/00* (2006.01)
  *H04L 29/06* (2006.01)

(52) U.S. Cl.
  CPC ............ *H04L 63/083* (2013.01); *H04N 1/00* (2013.01); *H04N 1/00204* (2013.01); *H04N 1/00347* (2013.01); *H04N 2201/0031* (2013.01); *H04N 2201/0094* (2013.01)

(58) Field of Classification Search
  USPC .............................. 358/1.14, 1.9, 1.15, 474
  See application file for complete search history.

(56) References Cited

U.S. PATENT DOCUMENTS

| | | | |
|---|---|---|---|
| 2009/0070372 A1* | 3/2009 | Mukund | G03G 15/5075 |
| 2009/0300734 A1* | 12/2009 | Hiramoto | G06F 21/31 |
| | | | 726/5 |
| 2011/0099626 A1* | 4/2011 | Tsujimoto | H04N 1/00344 |
| | | | 726/18 |
| 2011/0228311 A1* | 9/2011 | Oguma | G06F 21/305 |
| | | | 358/1.14 |
| 2013/0031619 A1 | 1/2013 | Waltermann et al. | |
| 2014/0325595 A1* | 10/2014 | Shinosaki | G06F 21/31 |
| | | | 726/2 |

FOREIGN PATENT DOCUMENTS

| | | |
|---|---|---|
| JP | 2006-085641 | 3/2006 |
| JP | 2006-101484 | 4/2006 |
| JP | 2009-067051 | 4/2009 |
| JP | 2011-95792 | 5/2011 |
| JP | 2011-192115 | 9/2011 |
| JP | 2012-216130 | 11/2012 |
| RU | 2 421 778 C2 | 6/2011 |

OTHER PUBLICATIONS

Extended European Search Report issued Jul. 15, 2016 in Patent Application No. 14842426.0.
Office Action dated May 19, 2017, in Russian Patent Application No. 2016112188 (with English-language translation).
Office Action dated Jan. 24, 2017, in Japanese Patent Application No. 2013-182297.

* cited by examiner

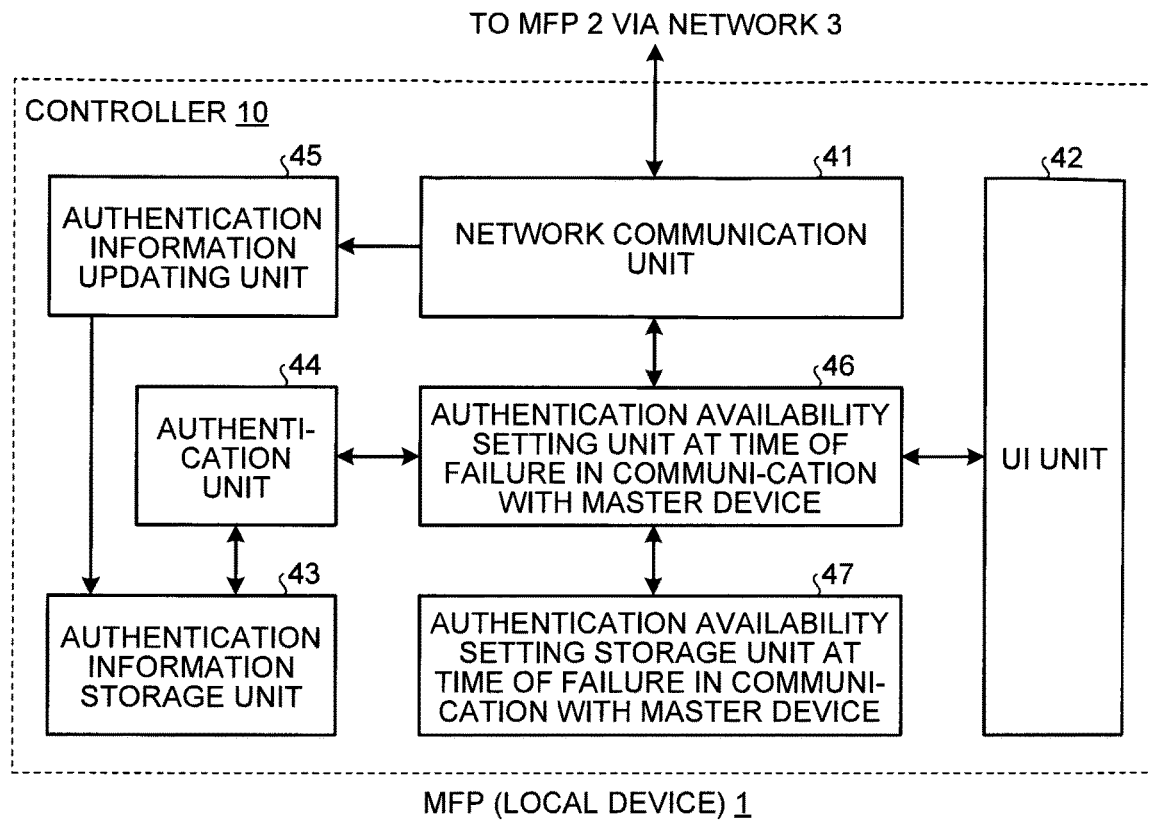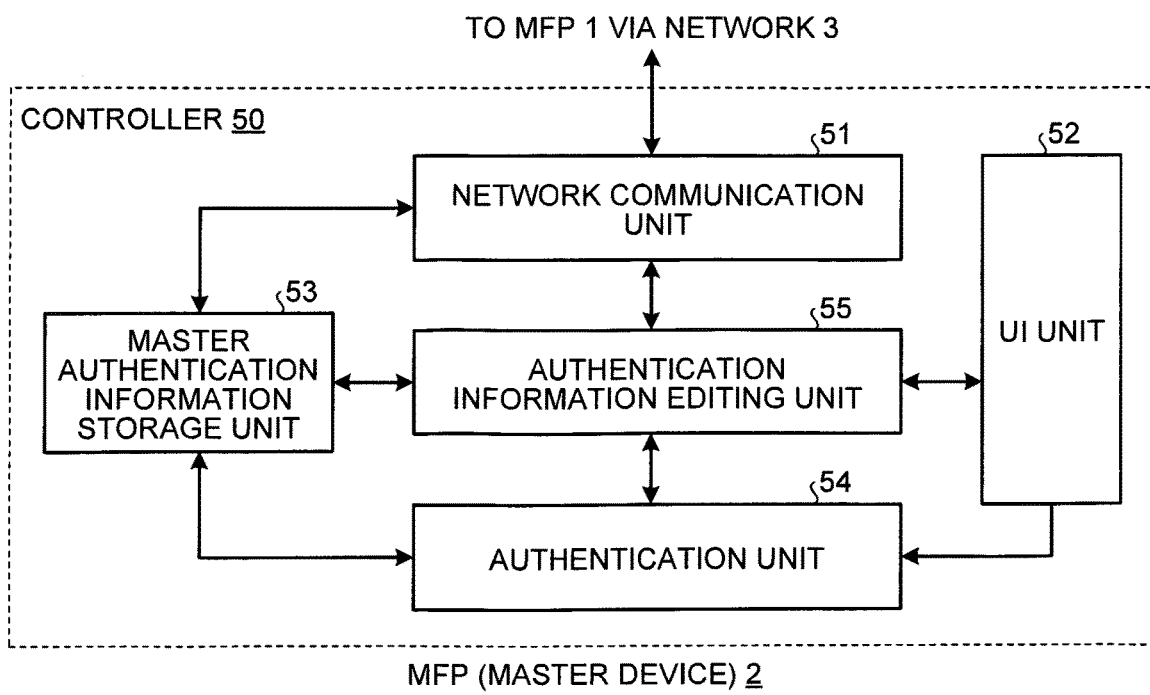

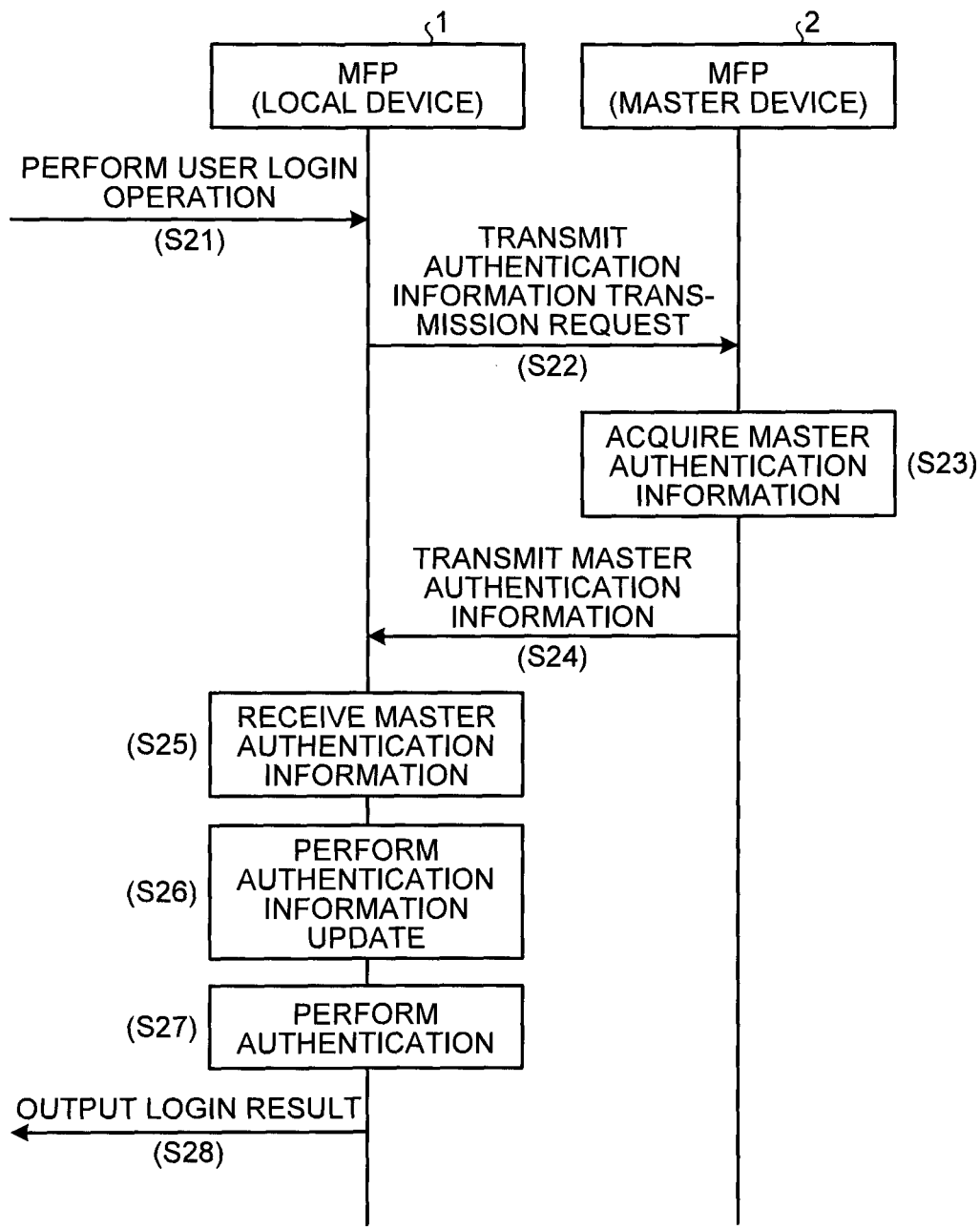

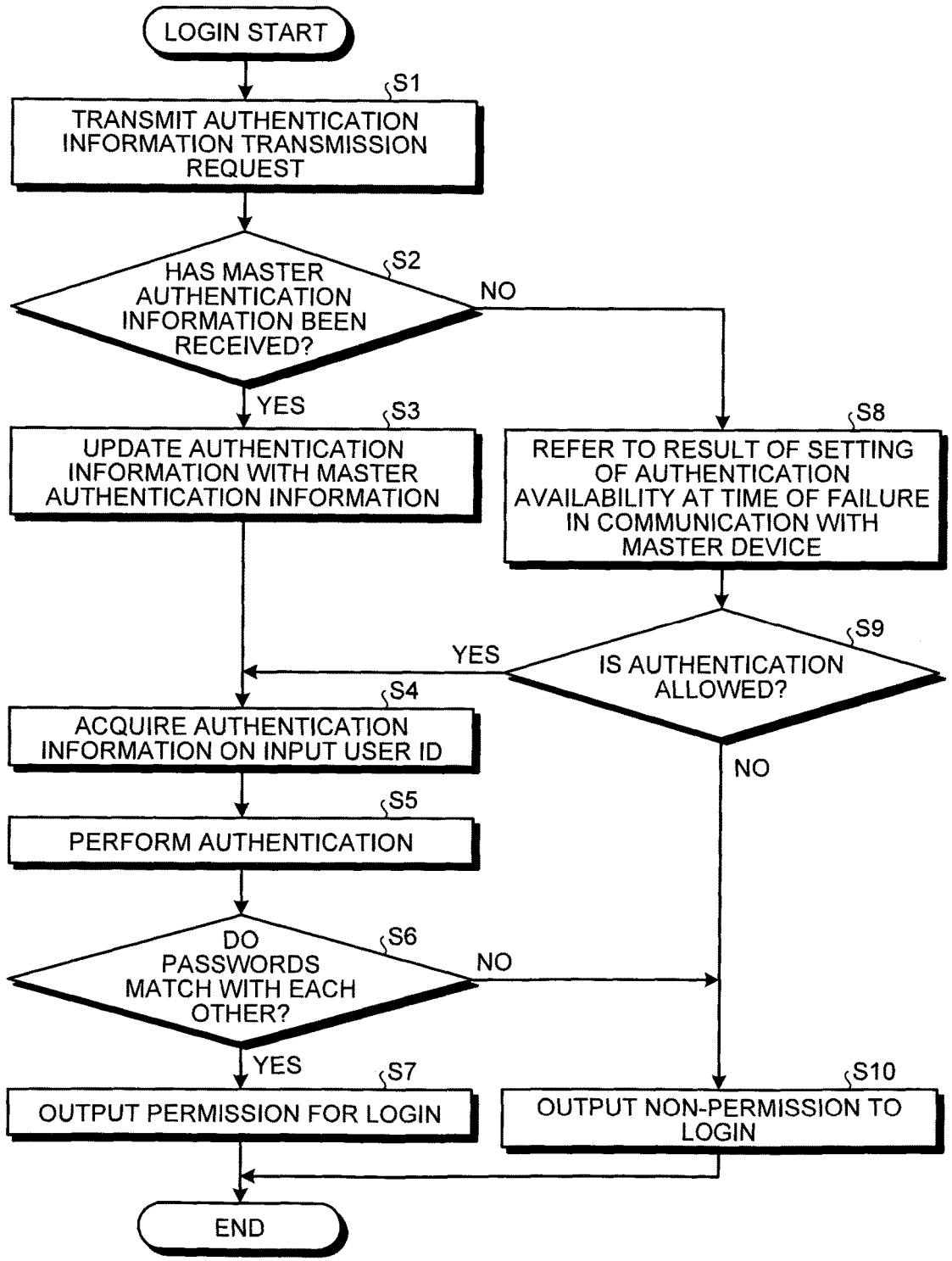

IMAGE PROCESSING APPARATUS AUTHENTICATION SYSTEM AND IMAGE PROCESSING APPARATUS

TECHNICAL FIELD

The present invention relates to an image processing apparatus authentication system that allows an image processing apparatus, such as a scanner, a printer, a facsimile machine, a copier, or a multifunction peripheral having multiple functions, to perform user authentication, and relates to the image processing apparatus.

BACKGROUND ART

In recent years, it has become common to connect various multiple image processing apparatuses (mainly, image forming apparatuses) to a network, such as a LAN, and share the image processing apparatuses among a number of users. For example, it has become popular to transmit and print data, such as a document, generated by a personal computer (PC) to and by a designated printer, multifunction peripheral, or the like via a network.

In this case, to ensure the security and to limit functions available to users, it is necessary to provide an authentication function to each of the image processing apparatuses.

To perform an authentication, it is also necessary to generate and store in advance a database of authentication information (in general, user accounts with user names and passwords) on users who are able to use the image processing apparatuses, for each of the image processing apparatuses. Further, it is necessary to enable editing, such as addition, deletion, or change, of the authentication information.

Therefore, if the database of the authentication information on each of the users and a corresponding editing function are to be provided to an individual image processing apparatus connected to the network, costs increase. Further, it is difficult to centrally manage the authentication information on all of the users in the network, so that management of the authentication information becomes cumbersome.

Therefore, it has been proposed to install an authentication server as a dedicated server in the network, store data of the authentication information necessary for authentication of all of the users in the authentication server, and allow the authentication server to independently perform editing. For example, Japanese Patent Application Laid-open No. 2012-216130 discloses a network system and an authentication system, in which an authentication server and image processing apparatuses as described above are connected via a network.

In such an authentication system, when an image processing apparatus receives a use request through input of user identification information (a login ID and a password) from a user, it transmits the user identification information and an authentication request to the authentication server to request authentication. Accordingly, the authentication server performs an authentication on the user identification information by using the database of the authentication information stored in the authentication server, and transmits an authentication result to the image processing apparatus. The image processing apparatus receives the authentication result, and determines whether to permit the user request form the user.

Therefore, if the authentication server is temporarily unable to perform authentication due to a trouble or the like in the network and the image processing apparatus is unable to receive a result of authentication performed by the authentication server, it becomes impossible to perform authentication and to use the image processing apparatus.

In the authentication system disclosed in Japanese Patent Application Laid-open No. 2012-216130, to cope with this problem, the image processing apparatus stores therein, as an authentication history, pieces of data of authentication results received from the authentication server in chronological order.

Further, if the image processing apparatus does not receive a normal authentication result from the authentication server even when transmitting user identification information and an authentication request to the authentication server to request authentication, the image processing apparatus itself is allowed to perform proxy authentication by using the authentication history stored in chronological order.

However, in the authentication system based on authentication using the dedicated authentication server as described above, costs to install and operate the authentication server become a problem.

Further, as disclosed in Japanese Patent Application Laid-open No. 2012-216130, if the authentication server is temporarily unable to perform authentication due to a trouble of the like in the network, the image processing apparatus itself is allowed to perform proxy authentication. However, as for a user who sends a use request to the image processing apparatus for the first time, an authentication history of user identification information on this user has not been stored, so that it is difficult to perform proxy authentication.

SUMMARY OF THE INVENTION

The present invention has been made to solve the problems as described above, and an object thereof is to centrally manage pieces of authentication information on users who use each of image processing apparatuses without using a dedicated authentication server, and to prevent each of the image processing apparatuses from being unable to perform authentication.

According to an embodiment, an image processing apparatus authentication system includes a plurality of image processing apparatuses connected to one another via a network. Each of the image processing apparatuses includes a user identification information input unit that receives user identification information; an authentication information storage unit that stores therein authentication information necessary for authentication on the user identification information; and an authentication unit that performs the authentication on the user identification information received by the user identification information input unit, based on the authentication information stored in the authentication information storage unit. One of the image processing apparatuses serves as a master device and the other image processing apparatuses serve as local devices. The master device and all of the local devices are able to communicate with one another. The authentication information storage unit of the master device stores, as pieces of master authentication information, authentication information necessary for the authentication on the user identification information on each of users who are able to use the image processing apparatuses, for each of the image processing apparatuses. The master device includes: an authentication information editing unit that edits the master authentication information; and an authentication information transmitting unit that, when the authentication information editing unit edits authentication information on the local device in the master authentication information, transmits the edited authentication information to the local device. Each of the local devices includes an authentication information receiving unit that receives the authentication information from the master device; and an authentication information updating unit that performs an update of the authentication information stored in the authentication information storage unit of the local device with the authentication information received by the authentication information receiving unit.

BRIEF DESCRIPTION OF DRAWINGS

FIG. 3 is a functional block diagram illustrating an example of a functional configuration of a controller 10 of the multifunction peripheral (local device) 1 illustrated in FIG. 1 according to the present invention.

FIG. 4 is a functional block diagram illustrating an example of a functional configuration of a controller 50 of the multifunction peripheral (master device) 2 illustrated in FIG. 1 according to the present invention.

FIG. 8 is a sequence diagram illustrating another example of the communication sequence between the local device and the master device after a user login operation on the multifunction peripheral (local device) 1 is performed.

FIG. 9 is a flowchart illustrating an example of a process when a user logs in to the multifunction peripheral (local device) 1.

DESCRIPTION OF EMBODIMENTS

Hereinafter, embodiments for carrying out the present invention will be described in detail based on drawings.

Figure 1:
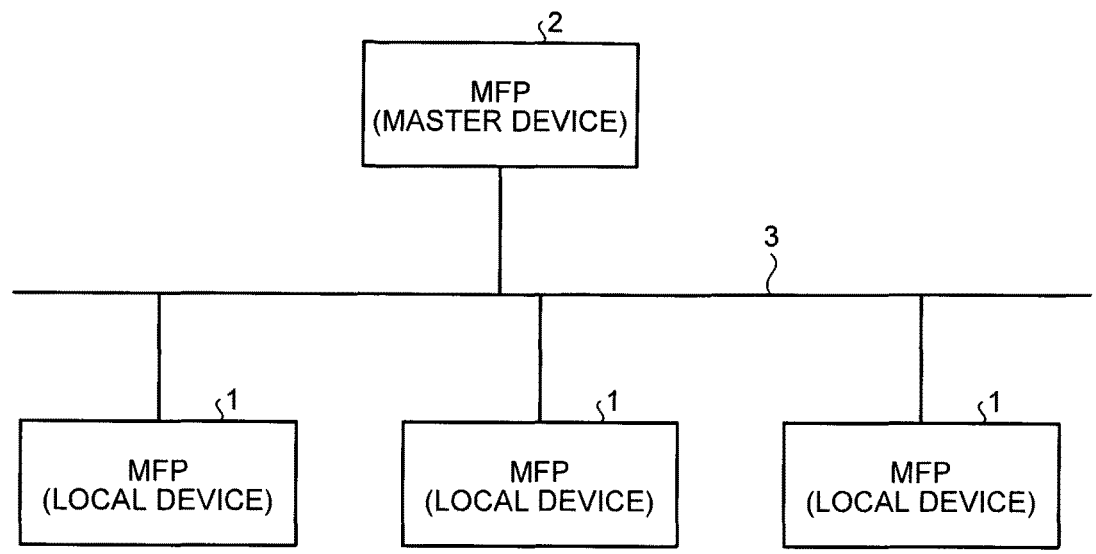
FIG. 1 is a schematic diagram illustrating a network configuration of an image processing apparatus authentication system according to an embodiment of the present invention.

First, an outline of an image processing apparatus authentication system according to an embodiment of the present invention will be described with reference to FIG. 1. FIG. 1 is a schematic diagram illustrating a network configuration of the image processing apparatus authentication system according to the embodiment.

The image processing apparatus authentication system connects multiple image processing apparatuses to one another via a network. Each of the image processing apparatuses includes a user identification information input unit, an authentication information storage unit, and an authentication unit.

The user identification information input unit receives user identification information (generally, a login ID and a password) when a user performs login.

The authentication information storage unit is a storage unit, such as a hard disk device, that stores therein authentication information necessary for an authentication on the user identification information.

The authentication unit performs the authentication on the user identification information input by the user identification information input unit, based on the authentication information stored in the authentication information storage unit.

Therefore, in the image processing apparatus authentication system, the authentication unit of each of the image processing apparatuses performs the authentication itself. Meanwhile, one of the image processing apparatuses serves as a master device, and the other image processing apparatuses serve as local devices. The master device and all of the local devices are able to communicate with one another via the above described network.

In this manner, the image processing apparatus authentication system does not use a dedicated authentication server. Further, the image processing apparatus serving as the master device stores, as master authentication information, authentication information necessary for the authentication on each of users who are able to use the image processing apparatuses, for each of the image processing apparatuses in the authentication information storage unit of the master device.

Furthermore, only the image processing apparatus serving as the master device can perform editing, such as addition, deletion, or change, of the authentication information in the master authentication information. Therefore, the image processing apparatus serving as the master device always stores latest pieces of the authentication information, and can centrally manage the pieces of the authentication information on all of the image processing apparatuses.

If the authentication information on a local device in the master authentication information is edited (or newly generated at the initial time), the edited authentication information is transmitted to an image processing apparatus serving as the local device.

Each of the image processing apparatuses serving as the local devices, upon receiving the authentication information from the image processing apparatus serving as the master device, performs updating the authentication information stored in the authentication information storage unit thereof with the received authentication information (or stores all pieces of the received authentication information as they are at the initial time).

With this operation, the authentication information storage unit of each of the image processing apparatuses serving as the local devices always stores therein the same authentication information as the authentication information on each of the image processing apparatuses in the latest master authentication information stored in the authentication information storage unit of the master device. This state will be referred to as a state of synchronization between pieces of the authentication information.

The image processing apparatus authentication system illustrated in FIG. 1 uses the multiple multifunction peripherals (MFPs) 1 and 2 with communication functions as the image processing apparatuses, and connect the multifunction peripherals 1 and 2 via a network 3, such as a local area network (LAN). As for the network 3, a network using an arbitrary communication protocol is applicable, regardless of whether it is wired or wireless. Meanwhile, the number of the multifunction peripherals connected to the network 3 is not limited to four.

The multifunction peripherals 1 and 2 are image processing apparatuses (including image forming apparatuses) with multiple functions, such as a printer function, a scanner function, a copy function, and a facsimile (FAX) function.

Of the multiple multifunction peripherals, the single multifunction peripheral 2 serves as a master device and the other multifunction peripherals 1 serve as local devices, and, the master device (the multifunction peripheral 2) and all of the local devices (the multifunction peripherals 1) are able to communicate with one another via the network 3. An individual identification code is registered in each of the multifunction peripherals, and the master device (the multifunction peripheral 2) and each of the local devices (the multifunction peripheral 1) can individually communicate with each other by using the identification codes.

Each of the multifunction peripherals 1 and 2 includes the user identification information input unit, the authentication information storage unit, and the authentication unit as described above. Further, in each of the multifunction peripherals 1 and 2, the authentication unit can perform an authentication on user identification information that is input to the user identification information input unit by a user, based on the authentication information stored in the authentication information storage unit. As the user identification information, a login ID, which is identification information for identifying each user, and a password (authentication information), which is a code for ensuring the authenticity of identity, are generally used.

Therefore, in the image processing apparatus authentication system, a dedicated authentication server is not used. Instead, the multifunction peripheral 2 serving as the master device stores, as the master authentication information, authentication information (password) necessary for the authentication on the user identification information on each of users who are able to use the multifunction peripherals, for each of the multifunction peripherals of the system in the authentication information storage unit.

Further, only the multifunction peripheral 2 serving as the master device can perform editing, such as addition, deletion, or change, of the authentication information in the master authentication. Therefore, the multifunction peripheral 2 always stores latest pieces of authentication information, and can centrally manage the pieces of the authentication information on all of the multifunction peripherals 1 and 2.

If the multifunction peripheral 2 edits (or, at the initial time, newly generates) the authentication information on any of the multifunction peripherals 1 serving as the local devices in the master authentication information, the edited authentication information is transmitted to the multifunction peripherals 1 serving as the local device.

Each of the multifunction peripherals 1, upon receiving the edited authentication information from the multifunction peripheral 2, performs updating the authentication information stored in the authentication information storage unit thereof with the received authentication information (or stores all pieces of the received authentication information as they are at the initial time).

With this operation, the authentication information storage unit of each of the multifunction peripherals 1 serving as the local devises always stores therein the same authentication information as the authentication information on each of the multifunction peripherals 1 in the latest master authentication information stored in the authentication information storage unit of the multifunction peripheral 2 serving as the master device.

Figure 2:
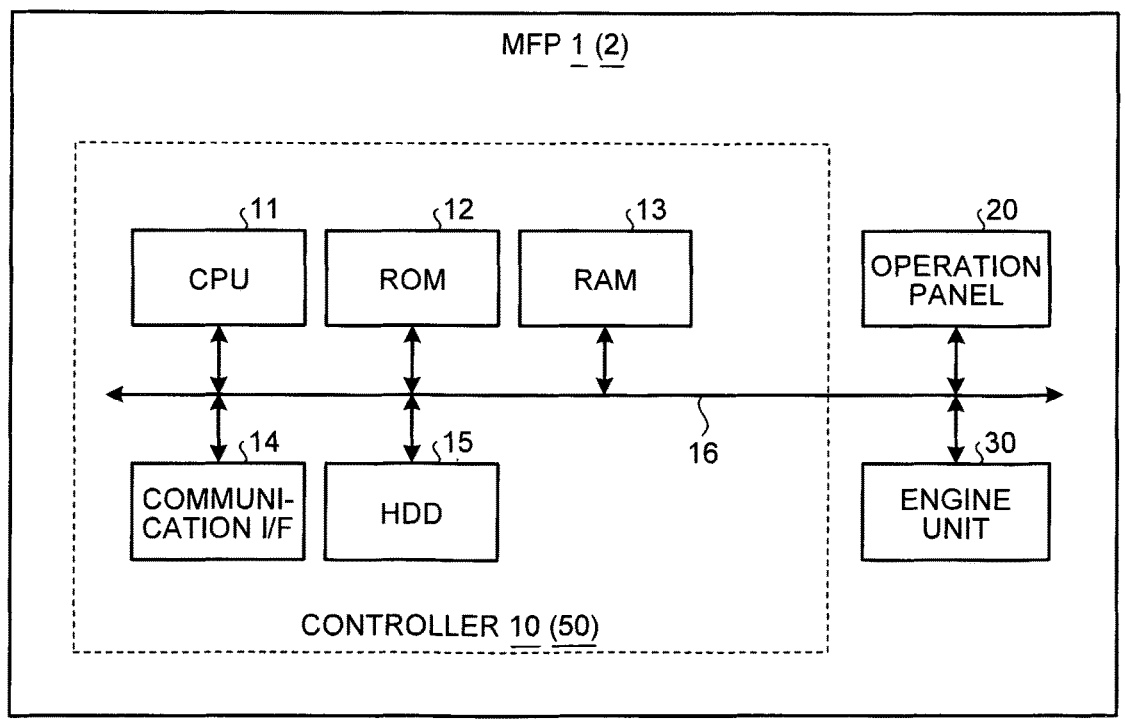
FIG. 2 is a block diagram illustrating an example of a hardware configuration of each of multifunction peripherals 1 and 2 illustrated in FIG. 1.

FIG. 2 is a block diagram illustrating an example of a hardware configuration of each of the multifunction peripherals 1 and 2.

All of the multifunction peripherals 1 serving as the local devices and the multifunction peripheral 2 serving as the master device illustrated in FIG. 1 have substantially the same hardware configurations, and are configured as illustrated in FIG. 2. Specifically, a controller 10 (or denoted by 50 in the case of the master device), an operation panel 20, and an engine unit 30 are provided.

The controller 10 (50) includes a CPU 11, a ROM 12, a RAM 13, a communication I/F 14, and an HDD 15.

The components are connected so as to be able to exchange data, addresses, and control signals with one another via a system bus 16, and the components in the controller 10 (or 50) form a microcomputer.

Meanwhile, "I/F" is a general abbreviation for an "interface", and "HDD" is a general abbreviation for a "hard disk drive".

The CPU 11 is a central processing unit that selectively executes programs stored in the ROM 12 or the HDD 15 by using the RAM 13 as a work area to thereby integrally control the entire multifunction peripherals 1 (or 2) and realize various functions related to the present invention to be described later.

The ROM 12 is a read only memory in which the programs executed by the CPU 11 and fixed data necessary for execution of the programs are stored in advance.

The RAM 13 is a readable and writable memory that is used as a work area when the CPU 11 executes the programs and that stores therein temporary data.

The communication I/F 14 is an interface for communicating with an external device, such as a personal computer (PC), via the network 3.

The HDD 15 is a non-volatile large-capacity storage that stores therein the programs executed by the CPU 11, the fixed data necessary for execution of the programs, and various setting values in a setting changeable manner, and also stores the authentication information necessary for the authentication on the user identification information to be input.

Meanwhile, it may be possible to provide a non-volatile storage memory, such as a non-volatile RAM, instead of the HDD 15 or in addition to the HDD 15.

The operation panel 20 includes a display unit formed of a liquid crystal display or the like for presenting information to a user, and an operating unit including various keys, switches, or operation buttons to be operated by the user and including a transparent touch panel or the like superimposed on a display screen of the display unit.

The engine unit 30 performs operations to implement a selected function, such as a printer function, a scanner function, a copy function, or a FAX function. For example, it serves as a scanner unit or an image reading unit that scans and reads an image of an original, a plotter unit or an image forming unit that performs printing on a sheet recording material, or a FAX communication unit, such as a modem, for performing facsimile communication.

FIG. 3 is a functional block diagram illustrating an example of a functional configuration of the controller 10 of the multifunction peripheral (local device) 1 illustrated in FIG. 2.

The controller 10 realizes functions of respective units illustrated in FIG. 3 when the CPU 11, which forms the microcomputer and is illustrated in FIG. 2, executes the programs stored in the ROM 12 or the HDD 15.

The functions of the respective units are a network communication unit 41, an UI unit 42, an authentication information storage unit 43, an authentication unit 44, an authentication information updating unit 45, an authentication availability setting unit 46 at the time of failure in communication with the master device, and an authentication availability setting storage unit 47 at the time of failure in communication with the master device. Meanwhile, "UI" is a general abbreviation for a "user interface".

The network communication unit 41 communicates with the multifunction peripheral 2 serving as the master device via the network 3 by using the communication I/F 14 illustrated in FIG. 2. The network communication unit 41 has functions of an authentication information receiving unit for receiving authentication information transmitted from the multifunction peripheral 2 serving as the master device, and an authentication information transmission requesting unit for transmitting an authentication information transmission request to the multifunction peripheral 2 serving as the master device when the user identification information is input.

The UI unit 42 controls display of a screen on the display unit equipped with the touch panel of the operation panel 20 illustrated in FIG. 2 to be operated by the user, and performs control related to the present invention. For example, the UI unit 42 functions as a user identification information input unit that controls display of a login screen or the like when a user performs login. Further, the UI unit 42 controls input/output or the like for setting availability of the authentication at the time of failure in communication with the multifunction peripheral 2 serving as the master device, as will be described later.

The authentication information storage unit 43 is formed of a non-volatile memory and stores authentication information necessary for authentication of a user who can use the multifunction peripheral 1 serving as the local device, and, in the present embodiment, the HDD 15 illustrated in FIG. 2 is used.

The authentication unit 44 is an authentication unit that performs an authentication on user identification information (a user account with a user ID and a password) input from the UI unit 42, based on the authentication information (a password corresponding to a user ID) stored in the authentication information storage unit 43.

The authentication information updating unit 45 is a unit that, when the network communication unit 41 receives the authentication information from the multifunction peripheral 2 serving as the master device, performs updating the authentication information stored in the authentication information storage unit 43 with the received authentication information.

At the time of failure in communication with the master device, the authentication availability setting unit 46 sends, to the authentication unit 44, the user identification information input by a user from the UI unit 42 in the present embodiment. Further, the function of the authentication information transmission requesting unit of the network communication unit 41 is instructed to request the multifunction peripheral 2 serving as the master device to transmit the latest authentication information on this multifunction peripheral 1. Consequently, the network communication unit 41 transmits an authentication information transmission request to the multifunction peripheral 2 serving as the master device by using the function of the authentication information transmission request unit.

Figure 5:
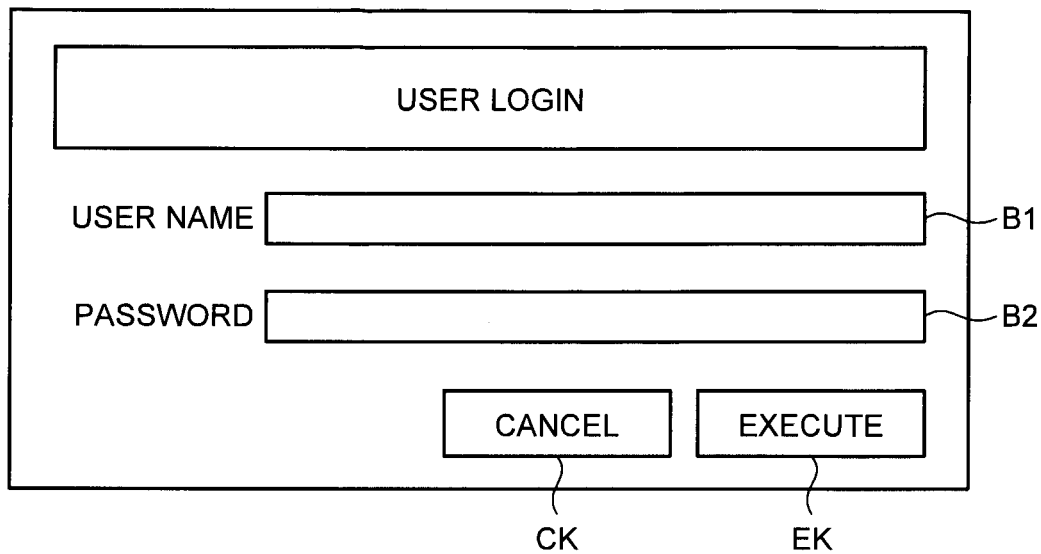
FIG. 5 is a diagram illustrating an example of a user login screen displayed on an operation panel when a user logs in to the multifunction peripherals 1 and 2 illustrated in FIG. 1.

FIG. 5 is a diagram illustrating an example of a user login screen that the UI unit 42 of the multifunction peripheral 1 displays on the display unit of the operation panel 20 illustrated in FIG. 2 by using the function of the user identification information input unit when a user performs login.

The user, when using the multifunction peripheral 1, enters a user ID in a text box B1 for a user name and enters a password in a text box B2 for a password by key operations on the user login screen illustrated in FIG. 5, and thereafter touches an execution key EK. Accordingly, the user identification information can be input to the multifunction peripheral 1. If a cancel key CK is touched, it becomes possible to input the user identification information again. The input user identification information is temporarily stored in the RAM 13 illustrated in FIG. 2.

At the time of failure in communication with the master device, the authentication availability setting unit 46 has a function to select and set in advance whether or not the authentication unit 44 of the multifunction peripheral 1 serving as the local device is allowed to perform the authentication when network communication with the multifunction peripheral 2 fails. This is the function of the authentication availability setting unit.

This function is enabled only after a system administrator inputs an administrator special account (a user ID and a password) and performs login on the user login screen illustrated in FIG. 5 on the operation panel 20 of the multifunction peripheral 1.

Figure 6:
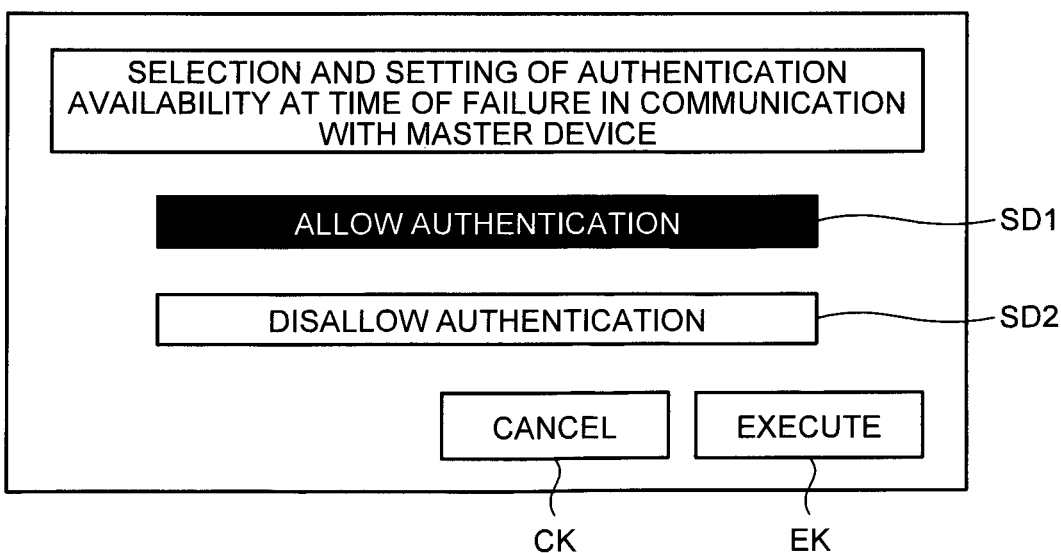
FIG. 6 is a diagram illustrating an example of a screen displayed on the operation panel for selecting and setting availability of an authentication in the multifunction peripheral (local device) 1 illustrated in FIG. 1 at the time of failure in communication with the master device.

In this case, the UI unit 42 displays a screen as illustrated in FIG. 6 for selecting and setting availability of the authentication at the time of failure in communication with the master device, on the display unit of the operation panel 20. On the screen illustrated in FIG. 6, if the system administrator touches a selection display SD1 of "authentication is allowed" such that the display is inverted as illustrated in the drawing, and subsequently touches the execution key EK, "authentication is allowed" is set. If a selection display SD2 of "authentication is disallowed" is touched such that the display is inverted, and subsequently the execution key EK is touched, "authentication is disallowed" is set. It is preferable to set "authentication is allowed" under normal conditions.

A result of the setting by the function of the authentication availability setting unit is stored in the authentication availability setting storage unit 47, which serves as an authentication availability setting storage unit at the time of failure in communication with the master device. As the authentication availability setting storage unit 47, the HDD 15 illustrated in FIG. 2 is used.

As for this setting operation, as described above, it is preferable to perform control such that the setting is possible only with an administrator authority available to only the system administrator, without allowing arbitrary users to do the setting.

Incidentally, it may be possible to omit the respective functions of the authentication availability setting unit and the authentication availability setting storage unit, and maintain a setting state in which the authentication unit 44 in the multifunction peripheral 1 serving as the local device is always allowed to perform the authentication when network communication with the multifunction peripheral 2 fails.

FIG. 4 is a functional block diagram illustrating an example of a functional configuration of the controller 50 of the multifunction peripheral (master device) 2 illustrated in FIG. 2.

The controller 50 realizes functions of respective units illustrated in FIG. 4 when the CPU 11, which forms the microcomputer and is illustrated in FIG. 2, executes the programs stored in the ROM 12 or the HDD 15.

The functions of the respective units are a network communication unit 51, a UI unit 52, a master authentication information storage unit 53, an authentication unit 54, and an authentication information editing unit 55.

The network communication unit 51 communicates with the multifunction peripherals 1 serving as the local devices via the network 3 by using the communication I/F 14 illustrated in FIG. 2. The network communication unit 51 has a function of an authentication information transmission unit that, when the authentication information editing unit 55 edits authentication information on the multifunction peripherals 1 serving as the local devices in the master authentication information as will be described later, transmits the edited authentication information to the multifunction peripherals 1 serving as the local devices. Further, the network communication unit 51, upon receiving an authentication information transmission request from any of the multifunction peripherals 1 serving as the local devices, receives the authentication information transmission request. Subsequently, from the master authentication information stored in the master authentication information storage unit 53, the latest authentication information on the multifunction peripheral 1 serving as the local device that has issued the authentication information transmission request is transmitted to the multifunction peripheral 1 by using the function of the authentication information transmission unit.

The UI unit 52 controls display of a screen on the display unit equipped with the touch panel of the operation panel 20 illustrated in FIG. 2 to be operated by the user, and performs control related to the present invention. For example, the UI unit 52 controls display of a login screen, input of user identification information, or the like by using the function of the user identification information input unit when a user performs login. In this case, a user login screen similar to the screen illustrated in FIG. 5 is displayed on the operation panel 20, and the user of the multifunction peripheral 2 can input user identification information (a user ID and a password) to the multifunction peripheral 2 similarly to the user of the multifunction peripheral 1 serving as the local device as described above.

Further, to allow the system administrator to perform an editing operation on the master authentication information via the operation panel 20 of the multifunction peripheral 2 as will be described later, the UI unit 52 displays a screen for editing the master authentication information on the operation panel 20, accepts input of editing, and sends it to the authentication information editing unit 55.

This function is enabled only after the system administrator inputs an administrator special account (a user ID and a password) and performs login on the user login screen as illustrated in FIG. 5.

However, in general, a not-illustrated information processing apparatus, such as a personal computer, is connected to the network 3 illustrated in FIG. 1, and the system administrator inputs the administrator special account from this information processing apparatus to the multifunction peripheral 2 serving as the master device to perform login. Then, if authentication is OK, the system administrator can access the controller 50 of the multifunction peripheral 2 from the information processing apparatus via the network communication unit 51, and can operate the authentication information editing unit 55 to edit the master authentication information.

The master authentication information storage unit 53 stores, as the master authentication information, authentication information (password corresponding to each user ID) necessary for the authentication on the user identification information on each of users who are able to use the multifunction peripherals 1 and 2 included in the image processing apparatus authentication system, for each of the multifunction peripherals. Namely, the master authentication information storage unit 53 is formed of a non-volatile memory, and, in the present embodiment, the HDD 15 illustrated in FIG. 2 is used.

The authentication unit 54 performs an authentication on the user identification information (a user account with a user ID and a password) input from the UI unit 52, based on the authentication information stored in the master authentication information storage unit 53. The authentication function by the authentication unit 54 is the same as the authentication function by the authentication unit 44 of the multifunction peripheral 1 serving as the local device.

The authentication information editing unit 55 edits the master authentication information stored in the master authentication information storage unit 53. The authentication information editing unit 55 functions when the system administrator logs in to the multifunction peripheral 2 via the above-described information processing apparatus or the operation panel 20 and performs an authentication information editing operation. Then, editing, such as addition, change, or deletion, of the master authentication information stored in the master authentication information storage unit 53 is performed.

If the authentication information editing unit edits the authentication information on the multifunction peripheral 1 serving as the local device in the master authentication information, the edited authentication information is transmitted to the multifunction peripheral 1 by the function of the authentication information transmission unit of the network communication unit 51. The authentication information to be transmitted is authentication information that is on the multifunction peripheral 1 and that is edited at least this time; however, it is preferable to transmit all pieces of the edited authentication information on the multifunction peripheral 1.

In the multifunction peripheral 2 serving as the master device, when authentication information on any of the multifunction peripherals 1 is edited for the first time and new authentication information is generated and stored as the master authentication information in the master authentication information storage unit 53, all pieces of the authentication information on the multifunction peripheral 1 are transmitted to the multifunction peripheral 1.

When the network communication unit 41 of the multifunction peripheral 1 receives the pieces of the authentication information transmitted from the multifunction peripheral 2, the authentication information updating unit 45 stores all of the pieces of the authentication information in the authentication information storage unit 43. Consequently, the pieces of the authentication information necessary to authenticate all of users who are able to use the multifunction peripheral 1 at this time are stored in the authentication information storage unit 43.

Thereafter, in the multifunction peripheral 2 serving as the master device, when the authentication information on the multifunction peripheral 1 is edited, the edited authentication information is transmitted to the multifunction peripheral 1 and received by the network communication unit 41 of the multifunction peripheral 1. Subsequently, the authentication information updating unit 45 performs updating the authentication information stored in the authentication information storage unit 43 with the received authentication information.

In this update, when the network communication unit 41 receives all pieces of the authentication information on the multifunction peripheral 1, all pieces of the authentication information stored in the authentication information storage unit 43 are re-written by overwriting. When only a new piece of authentication information on the multifunction peripheral 1 subjected to editing, such as addition, change, or deletion, is received, update is performed by adding, changing, or deleting only this authentication information with respect to the authentication information stored in the authentication information storage unit 43.

Therefore, the authentication information storage unit 43 of the multifunction peripheral 1 serving as the local device always stores therein the same pieces of the authentication information as all pieces of the authentication information on the multifunction peripheral 1 in the master authentication information stored in the master authentication information storage unit 53 of the multifunction peripheral 2 serving as the master device.

Therefore, when the user identification information is input to the multifunction peripheral 1 serving as the local device, even if the authentication unit 44 immediately performs the authentication on the user identification information by using the authentication information stored in the authentication information storage unit 43, a problem is less likely to occur.

However, when the multifunction peripheral 2 serving as the master device transmits the edited authentication information to the multifunction peripheral 1 serving as the local device, and if a failure occurs in the network communication or if the multifunction peripheral 1 is broken or the power thereof is OFF, communication with the master device may fail.

Therefore, in the present embodiment, the authentication information transmission request is transmitted, without fail, to the multifunction peripheral 2 serving as the master device every time the user identification information is input to the multifunction peripheral 1 serving as the local device. Upon receiving the authentication information transmission request, the multifunction peripheral 2 serving as the master device reads, from the master authentication information stored in the master authentication information storage unit 53, the latest authentication information on the multifunction peripheral 1 serving as the local device that has issued the authentication information transmission request, and transmits it to the multifunction peripheral 1. When the multifunction peripheral 1 receives the latest authentication information, the authentication information updating unit 45 performs updating the authentication information stored in the authentication information storage unit 43 with the received authentication information, to thereby obtain the latest authentication information.

The latest authentication information received from the multifunction peripheral 2 serving as the master device is usually the same as the authentication information stored in the authentication information storage unit 43 at this time, and in such a case, it is the same if the update is performed or not. However, as compared to do such determination, performing the update by overwriting all pieces of the authentication information at all times is an easier and more reliable way.

Subsequently, the authentication unit 44 of the multifunction peripheral 1 performs the authentication on the input user identification information by using the updated authentication information in the authentication information storage unit 43, so that the reliability of the authentication is improved.

However, when the user identification information is input to the multifunction peripheral 1 serving as the local device and the authentication information transmission request is transmitted to the multifunction peripheral 2 serving as the master device, in some cases, communication with the master device may fail due to a failure or the like in the network communication, and the latest authentication information may not be received from the multifunction peripheral 2 within a predetermined time.

In this case, the authentication information in the authentication information storage unit 43 of the multifunction peripheral 1 is not subjected to the update, and the authentication unit 44 performs the authentication on the input user identification information by using the non-updated authentication information. Even in this case, under normal conditions, when the master authentication information on the multifunction peripheral 1 serving as the local device is edited, the authentication information in the authentication information storage unit 43 of the multifunction peripheral 1 is also updated as described above; therefore, a problem is less likely to occur in the authentication performed by the authentication unit 44.

However, if a result of setting of the authentication availability is stored in the authentication availability setting storage unit 47 at the time of failure in communication with the master device illustrated in FIG. 3, the authentication unit 44 performs the above described authentication only when the setting of "authentication is allowed" is stored. When the setting of "authentication is disallowed" is stored, notice indicating that the authentication is disabled is displayed on the display screen of the operation panel 20. This is a case where the system administrator is allowed to set "authentication is disallowed" in advance to put more importance on the reliability of the authentication.

Figure 7:
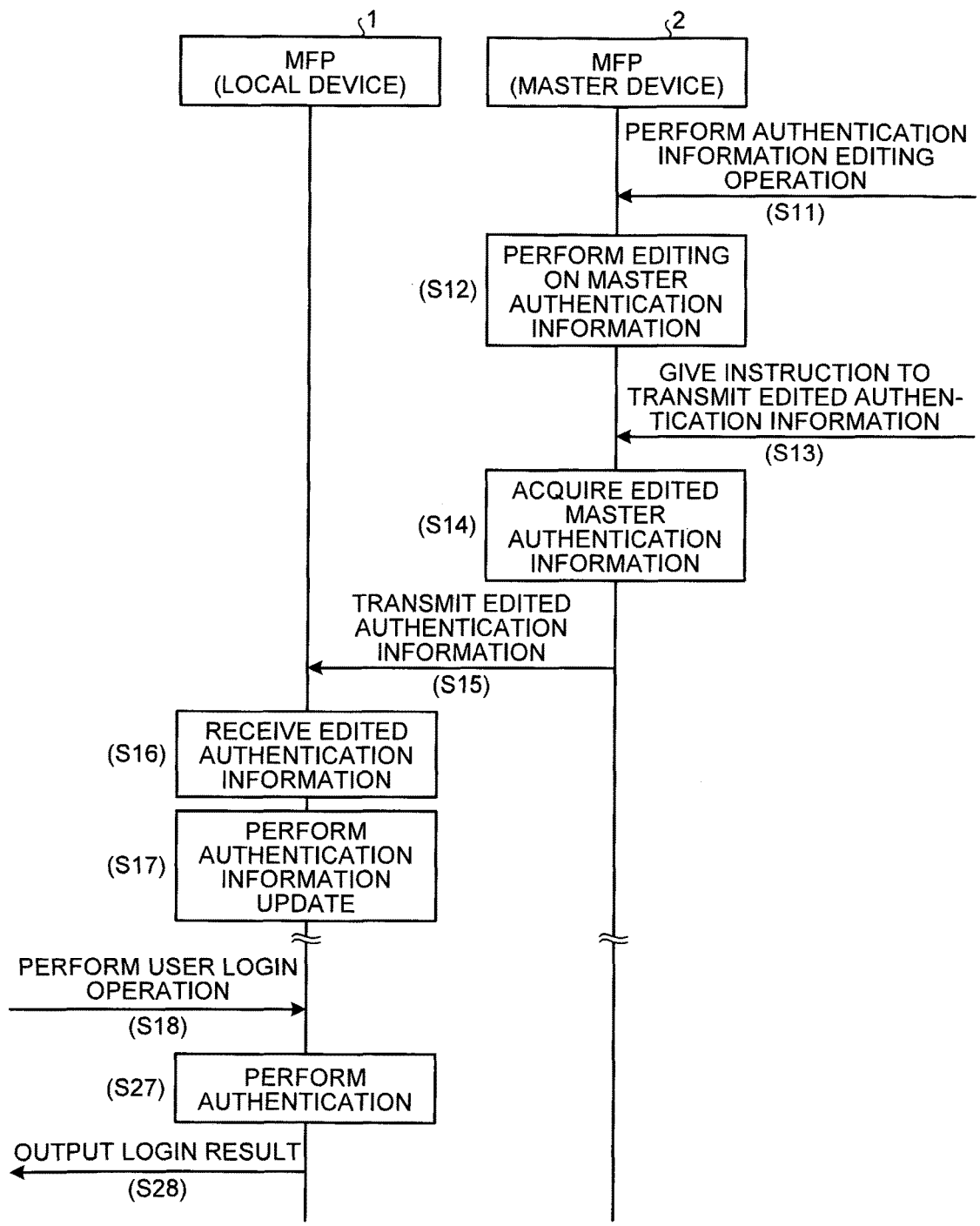
FIG. 7 is a sequence diagram illustrating an example of a communication sequence between the local device and the master device after the multifunction peripheral (master device) 2 has performed an authentication information editing operation.

FIG. 7 is a sequence diagram illustrating an example of a communication sequence between the local device and the master device after the multifunction peripheral (master device) 2 has performed the authentication information editing operation.

When the system administrator performs login from the operation panel 20 of the multifunction peripheral 2 or an information processing apparatus, such as a personal computer, connected to the network, it is possible to perform an authentication information editing operation on the multifunction peripheral (master device) 2 (S11). Through the authentication information editing operation, the authentication information editing unit 55 of the multifunction peripheral (master device) 2 performs an editing process on the master authentication information stored in the master authentication information storage unit 53 (S12).

If the master authentication information on the multifunction peripheral (local device) 1 is edited through the editing process, the system administrator instructs the multifunction peripheral (master device) 2 to transmit the edited authentication information after the editing is finished (S13). Accordingly, the network communication unit 51 of the multifunction peripheral (master device) 2 acquires the edited authentication information on the multifunction peripheral (local device) 1 from the edited master authentication information in the master authentication information storage unit 53 (S14). Subsequently, the edited authentication information is transmitted to the corresponding multifunction peripheral 1 (S15).

If pieces of the authentication information on the multiple multifunction peripherals (local devices) 1 are edited, it is possible to simultaneously transmit the pieces of the edited authentication information on the respective multifunction peripherals to the respective multifunction peripherals 1.

Meanwhile, if the authentication information editing unit 55 of the multifunction peripheral (master device) 2 edits the master authentication information on the multifunction peripheral (local device) 1, it may be possible to automatically transmit the edited authentication information on the multifunction peripheral 1 in the edited master authentication information to the corresponding multifunction peripheral 1 after the editing is finished. Alternatively, it may be possible to periodically transmit the latest master authentication information on each of the multifunction peripherals (local devices) 1 to each of the multifunction peripherals 1.

In the multifunction peripheral (local device) 1, the network communication unit 41 receives the edited authentication information (S16), and the authentication information updating unit 45 performs a process of updating the authentication information stored in the authentication information storage unit 43 with the received authentication information (S17).

Thereafter, if a user performs an operation of inputting user identification information to the multifunction peripheral (local device) 1 (performs user login) (S18), the authentication unit 44 of the multifunction peripheral 1 performs an authentication on the input user identification information (S27). In the authentication, the updated authentication information stored in the authentication information storage unit 43 of the multifunction peripheral 1 is used.

Subsequently, a result of the authentication is output as a login result (S28), and is displayed on the display screen of the operation panel 20. If the authentication is OK (login is OK), a process of printing, copying, facsimile transmission or the like designated by the user is subsequently performed.

FIG. 8 is a sequence diagram illustrating another example of the communication sequence between the local device and the master device after a user login operation on the multifunction peripheral (local device) 1 is performed.

In this case, if an operation (user login) of inputting user identification information to the multifunction peripheral (local device) 1 (S21), the multifunction peripheral 1 temporarily stores the user identification information, and the network communication unit 41 transmits an authentication information transmission request to the multifunction peripheral (master device) 2 (S22).

The multifunction peripheral (master device) 2, when the network communication unit 51 receives the authentication information transmission request, acquires, from the master authentication information storage unit 53, the latest authentication information on the multifunction peripheral (local device) 1 that has transmitted the authentication information transmission request (S23). Subsequently, the master authentication information is transmitted to the multifunction peripheral 1 that has issued the authentication information transmission request (S24).

When the multifunction peripheral (local device) 1 receives the master authentication information within a predetermined time since transmission of the authentication information transmission request by the network communication unit 41 (S25), the authentication information updating unit 45 performs an update on the authentication information stored in the authentication information storage unit 43 (S26).

Subsequently, the authentication unit 44 of the multifunction peripheral 1 performs an authentication on the user identification information, which has been input and temporarily stored beforehand, by using the updated authentication information (S27). Then, a result of the authentication is output as a login result (S28), and is displayed on the display screen of the operation panel 20. If the authentication is OK (login is OK), a process of printing, copying, facsimile communication, or the like designated by the user is subsequently performed.

While not illustrated in FIG. 8, if the network communication unit 41 of the multifunction peripheral (local device) 1 does not receive the master authentication information within the predetermined time since transmission of the authentication information transmission request, the authentication information updating unit 45 is unable to perform the update on the authentication information.

However, the authentication information, in which past results of editing the master authentication information are reflected, is stored in the authentication information storage unit 43. Therefore, the authentication unit 44 of the multifunction peripheral 1 performs the authentication on the user identification information, which has been input and temporarily stored beforehand, by using the authentication information stored in the authentication information storage unit 43 at this time, and outputs a result of the authentication as a login result.

Further, if a result of setting of the authentication availability is stored in the authentication availability setting storage unit 47 at the time of failure in communication with the master device illustrated in FIG. 3, the authentication unit 44 performs the above described authentication only when the setting of "authentication is allowed" is stored. When the setting of "authentication is disallowed" is stored, notice indicating that the authentication is disabled is displayed on the display screen of the operation panel 20.

When the user login operation is performed on the multifunction peripheral (master device) 2, the authentication unit 54 can perform the authentication on the input user identification information by using the master authentication information on the own device in the master authentication information storage unit 53 at all times.

FIG. 9 is a flowchart illustrating an example of a process when a user logs in to the multifunction peripheral (local device) 1. This process is performed by the controller 10 (mainly by the CPU 11). If the user identification information is input to the multifunction peripheral (local device) 1 by the user login operation, the controller 10 starts the process illustrated in FIG. 9.

First, at Step S1, an authentication information transmission request is transmitted to the multifunction peripheral (master device) 2. Subsequently, at Step S2, it is determined whether the master authentication information has been received within a predetermined time.

If the reception is successful, the process proceeds to Step S3, and the authentication information stored in the HDD 15 is updated with the received master authentication information.

Subsequently, at Step S4, the authentication information (password) corresponding to the user ID that is input as the user identification information is acquired from the updated authentication information, and, at Step S5, the authentication is performed. The authentication is performed by comparing the password input as the user identification information with the password acquired as the authentication information.

At Step S6, it is determined whether the both of the passwords match with each other. If they match with each other, the authentication is OK; therefore, at Step S7, permission for login is output and the process is finished.

In this case, the multifunction peripheral (local device) 1 performs a process corresponding to input of subsequent operations from the user.

In the determination at Step S6, if both of the passwords do not match with each other, the authentication is NG; therefore, at Step S10, non-permission for login is output and the process is finished.

In this case, the multifunction peripheral (local device) 1 does not receive input of subsequent operations from the user.

In the determination at Step S2, if the master authentication information has not been received within the predetermined time, the process proceeds to Step S8, and a result of setting of the authentication availability at the time of failure in communication with the master device is referred to. Subsequently, at Step S9, it is determined whether the authentication is allowed, and if the authentication is allowed, the process proceeds to Step S4 to acquire the authentication information (password) on the user ID input as the user identification information, and thereafter proceeds to Step S5 to perform the authentication. Further, the processes at Step S6 and Step S7 or Step S10 are performed as described above, and the process is finished.

In the determination at Step S9, if the authentication is not allowed, the authentication is not performed, non-permission for login is output at Step S10, and the process is finished.

Incidentally, if a result of setting of the authentication availability at the time of failure in communication with the master device is not stored, or if the setting function is omitted, the following is applicable Specifically, in the determination at Step S2, if the master authentication information has not been received within the predetermined time, the process at Step S3 is skipped, and the processes related to the authentication from Step S4 to Step S6 and Step S7 or Step S10 are performed, and thereafter, the process is finished.

As the embodiments of the image processing apparatus authentication system and the image processing apparatus according to the present invention, the configurations and functions of a multifunction peripheral authentication system, in which a multifunction peripheral is employed as an image processing apparatus, and the configurations and functions of the multifunction peripheral have been described. However, the image processing apparatus authentication system and the image processing apparatus according to the present invention are not limited to the above. The image processing apparatus may be a scanner, a printer, a facsimile machine, or a copier, or may be a combination of these devices and a multifunction peripheral.

Further, the above described embodiments, operation examples, configurations and functions of modifications may be added, changed, or partly deleted appropriately, and arbitrary combinations are possible as long as there is no contradiction.

According to an image processing apparatus authentication system of an embodiment of the present invention, it is possible to centrally manage pieces of authentication information on users who use each of image processing apparatuses without using a dedicated authentication server, and to allow each of the image processing apparatuses to perform an authentication at all times.

Although the invention has been described with, respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 Multifunction peripheral (local device)
2 Multifunction peripheral (master device)
3 Network
10, 50 Controller
11 CPU
12 ROM
13 RAM
14 Communication I/F
15 HDD
16 System bus
20 Operation panel
30 Engine unit
41 Network communication unit
42 UI unit
43 Authentication information storage unit
44 Authentication unit
45 Authentication information updating unit
46 Authentication availability setting unit at the time of failure in communication with a master device
47 Authentication availability setting storage unit at the time of failure in communication with a master device
51 Network communication unit
52 UI unit
53 Master authentication information storage unit
54 Authentication unit
55 Authentication information editing unit

The invention claimed is:

1. An image processing apparatus authentication system comprising:
a plurality of image processing apparatuses connected to one another via a network, each of the image processing apparatuses including:
processing circuitry configured to
receive user identification information;
store, at a memory, authentication information that includes user identification information that is necessary for authentication on the received user identification information; and
perform the authentication on the received user identification information, based on the stored authentication information, wherein
one of the image processing apparatuses serves as a master device and the other image processing apparatuses serve as local devices,
the master device and all of the local devices are able to communicate with one another,
the memory of the master device stores, as master authentication information, authentication information that includes user identification information that is necessary for the authentication on the received user identification information on each of users who are able to use the image processing apparatuses, for each of the image processing apparatuses,
the processing circuitry of the master device is further configured to:
edit the master authentication information; and when authentication information corresponding to authentication information stored on the local device is edited in the master authentication information, transmit the edited authentication information to the local device, and the processing circuitry of each of the local devices is further configured to:
receive the edited authentication information from the master device; and
perform an update of the authentication information stored in the memory of the local device with the received authentication information received, wherein the plurality of image processing apparatuses are a plurality of multi-functional peripherals, wherein when performing an editing operation on the master authentication information via an operation panel of the image processing apparatus serving as the master device, the processing circuitry of the image processing apparatus serving as the master device:
controls display of a screen for editing the master authentication information on the operation panel after receiving an input of authentication information corresponding to a system administrator; and
receives input of the editing of the master authentication information, and wherein the input of the authentication information corresponding to the system administrator is received from an external information processing apparatus that is connected to the image processing apparatus serving as the master device, and after the authentication information corresponding to the system administrator is verified, the external information processing apparatus is allowed to access the processing circuitry of the image processing apparatus serving as the master device via a network connection to control editing of the master authentication information.

2. The image processing apparatus authentication system according to claim 1, wherein the processing circuitry of the master device is further configured to
upon receiving an authentication information transmission request from any of the local devices, transmit authentication information on the local device that has issued the authentication information transmission request among the pieces of the master authentication information stored in the authentication information storage unit, to the local device, the processing circuitry of each of the local devices is further configured to
when the user identification information is received, transmit the authentication information transmission request to the master device, and
receive the authentication information from the master device, wherein after transmission of the authentication information transmission request, when the authentication information is received from the master device, the processing circuitry of the local device performs an update of the authentication information stored in the memory of the local device with the received authentication information, and, when the authentication information is not received from the master device due to a communication failure, the processing circuitry of the local device performs the authentication on the received user identification information on the local device by using the authentication information stored in the authentication information storage unit without performing the update.

3. The image processing apparatus authentication system according to claim 2, wherein
the processing circuitry of each of the local devices is further configured to:
when the authentication information is not received from the master device after the authentication information transmission request is transmitted to the master device due to the communication failure, select and set whether to allow the local device to perform the authentication; and
the memory of the local device stores therein a result of the setting.

4. An image processing apparatus that serves as a master device communicably connected to a plurality of image processing apparatuses serving as local devices via a network, the image processing apparatus comprising:
processing circuitry configured to
receive user identification information; and
a memory that stores therein, as master authentication information, authentication information that includes user identification information that is necessary for authentication on the received user identification information on each of users who are able to use the image processing apparatuses connected to the network, for each of the image processing apparatuses,
wherein the processing circuitry of the image processing apparatus is further configured to perform the authentication on the received user identification information, based on the master authentication information stored in the memory;
edit the master authentication information; and
when authentication information corresponding to authentication information stored on the local device is edited in the master authentication information, transmit the edited authentication information to the local device, wherein the plurality of image processing apparatuses, and the image processing apparatus that serves as the master device, are a plurality of multi-functional peripherals, wherein when performing an editing operation on the master authentication information via an operation panel of the image processing apparatus serving as the master device, the processing circuitry:
controls display of a screen for editing the master authentication information on the operation panel after receiving an input of authentication information corresponding to a system administrator; and
receives input of the editing of the master authentication information, and wherein the input of the authentication information corresponding to the system administrator is received from an external information processing apparatus that is connected to the image processing apparatus serving as the master device, and after the authentication information corresponding to the system administrator is verified, the external information processing apparatus is allowed to access the processing circuitry of the image processing apparatus serving as the master device via a network connection to control editing of the master authentication information.

5. The image processing apparatus according to claim 4, wherein the processing circuitry is further configured to, upon receiving an authentication information transmission request from any of the image processing apparatuses serving as the local devices, transmit authentication information on the local device that has issued the authentication information transmission request among the pieces of the master authentication information stored in the memory, to the local device.

6. An image processing apparatus that serves as a local device communicably connected to an image processing apparatus serving as a master device via a network, the image processing apparatus comprising:
processing circuitry configured to
receive user identification information;
store, at a memory, authentication information that includes user identification information that is necessary for authentication on the user identification information;
perform the authentication on the received user identification information, based on the stored authentication information;
receive the authentication information on the local device from the image processing apparatus serving as the master device; and
perform an update of the authentication information stored in memory with the received authentication information,
wherein the image processing apparatus and the image processing apparatus serving as the master device are multi-functional peripherals,
a memory of the master device stores, as master authentication information, authentication information that includes user identification information that is necessary for the authentication on the received user identification information on each of users who are able to use the image processing apparatus,
processing circuitry of the master device is further configured to:
edit the master authentication information; and
when authentication information corresponding to authentication information stored on the image processing apparatus is edited in the master authentication information, transmit the edited authentication information to the local device,
wherein when performing an editing operation on the master authentication information via an operation panel of the image processing apparatus serving as the master device, the processing circuitry of the image processing apparatus serving as the master device:
controls display of a screen for editing the master authentication information on the operation panel after receiving an input of authentication information corresponding to a system administrator; and
receives input of the editing of the master authentication information, and
wherein the input of the authentication information corresponding to the system administrator is received from an external information processing apparatus that is connected to the image processing apparatus serving as the master device, and after the authentication information corresponding to the system administrator is verified, the external information processing apparatus is allowed to access the processing circuitry of the image processing apparatus serving as the master device via a network connection to control editing of the master authentication information.

7. The image processing apparatus according to claim 6, wherein the processing circuitry is further configured to
when the user identification information is received, transmit the authentication information transmission request to the master device, and
receive the authentication information from the master device,
wherein after transmission of the authentication information transmission request, when the authentication information is received from the master device, the processing circuitry of the local device performs an update of the authentication information stored in the memory of the local device with the received authentication information, and, when the authentication information is not received from the master device due to a communication failure, the processing circuitry of the local device performs the authentication on the received user identification information on the local device by using the authentication information stored in the authentication information storage unit without performing the update.

8. The image processing apparatus according to claim 7, wherein the processing circuitry is further configured to:
when the authentication information is not received from the master device after the authentication information transmission request is transmitted to the master device due to the communication failure, select and set whether to allow the local device to perform the authentication, and
the memory of the local device stores therein a result of the setting.

9. The image processing apparatus authentication system according to claim 1, wherein the authentication information further includes password information.

* * * * *